US011234106B2

(12) United States Patent
Douglas et al.

(10) Patent No.: US 11,234,106 B2
(45) Date of Patent: Jan. 25, 2022

(54) SIMULTANEOUS CONTROL OF A SUBNET OF NODES IN A WIRELESS NETWORK

(71) Applicant: SIGNIFY HOLDING B.V., Eindhoven (NL)

(72) Inventors: Bruce Andrew Carl Douglas, Fayetteville, GA (US); Dominic Pritham, Newnan, GA (US); Ameya Ainapure, Atlanta, GA (US)

(73) Assignee: SIGNIFY HOLDING B.V., Eindhoven (NL)

( * ) Notice: Subject to any disclaimer, the term of this patent is extended or adjusted under 35 U.S.C. 154(b) by 435 days.

(21) Appl. No.: 16/261,213

(22) Filed: Jan. 29, 2019

(65) Prior Publication Data

US 2019/0239033 A1    Aug. 1, 2019

Related U.S. Application Data

(60) Provisional application No. 62/623,343, filed on Jan. 29, 2018.

(51) Int. Cl.
*H04W 4/06* (2009.01)
*H04L 29/06* (2006.01)
(Continued)

(52) U.S. Cl.
CPC ............... *H04W 4/06* (2013.01); *H04B 7/15* (2013.01); *H04L 12/189* (2013.01);
(Continued)

(58) Field of Classification Search
CPC ...... H04W 4/06; H04W 12/03; H04W 12/033; H04W 84/18; H04L 63/0428;
(Continued)

(56) References Cited

U.S. PATENT DOCUMENTS

| 2008/0056261 A1 | 3/2008 | Osborn et al. |
| 2012/0124367 A1 | 5/2012 | Ota et al. |

(Continued)

OTHER PUBLICATIONS

International search report for PCT/IB2019/050717, dated Apr. 24, 2019.
(Continued)

*Primary Examiner* — Dac V Ha

(57) ABSTRACT

A system for simultaneous control of a subset of nodes in a wireless network includes a network controller and a plurality of nodes that are communicatively coupled to the network controller. The network controller transmits a custom Zigbee unicast message to a node of the subset of nodes that is assigned as a point guard node upon receiving an instruction to control one or more nodes of the subset of nodes. The point guard node receives the custom Zigbee unicast message and generates an InterPAN broadcast message based on a payload of the custom Zigbee unicast message. The point guard node broadcasts the InterPAN broadcast message as a one hop broadcast message to all the nodes in the radio range of the point guard node. The receiving nodes whose identifiers are present in the payload of the InterPAN broadcast message act on the instruction to change a status thereof.

20 Claims, 11 Drawing Sheets

(51) Int. Cl.
  *H04L 12/18*   (2006.01)
  *H04L 12/28*   (2006.01)
  *H04W 12/03*   (2021.01)
  *H04W 12/033*  (2021.01)
  *H04B 7/15*    (2006.01)
  *H04W 84/18*   (2009.01)

(52) U.S. Cl.
  CPC ...... *H04L 12/2816* (2013.01); *H04L 63/0428* (2013.01); *H04W 12/03* (2021.01); *H04W 12/033* (2021.01); *H04L 2012/285* (2013.01); *H04W 84/18* (2013.01)

(58) Field of Classification Search
  CPC ............... H04L 12/189; H04L 12/2816; H04L 2012/285; H04B 7/15
  See application file for complete search history.

(56) References Cited

U.S. PATENT DOCUMENTS

| | | | | |
|---|---|---|---|---|
| 2016/0142263 A1* | 5/2016 | Erdmann | ................ | H04L 41/12 |
| | | | | 455/41.2 |
| 2020/0029411 A1* | 1/2020 | Barna | ................... | F21V 23/003 |
| 2020/0137848 A1* | 4/2020 | Kamp | ................... | H04W 84/18 |

OTHER PUBLICATIONS

Chun-Hsien, Wu et al: "A Gateway-Based Inter-PAN Binding Mechanism for ZigBee Sensor Net-works", IECON 2011—37th Annual Conference on IEEE Industrial Electronics Society, IEEE, Nov. 7, 2011, pp. 38-8-3813.sex.

\* cited by examiner

SIMULTANEOUS CONTROL OF A SUBNET OF NODES IN A WIRELESS NETWORK

CROSS-REFERENCE TO RELATED APPLICATIONS

This application claims priority to U.S. Provisional Patent Application No. 62/623,343 filed on Jan. 29, 2018 and entitled "Simultaneous Control of a Subset of Nodes in a Wireless Network," the entire contents of which are hereby incorporated herein by reference.

TECHNICAL FIELD

Embodiments of the present disclosure relate generally to wireless networks, and more particularly simultaneous control of a subnet of nodes in a wireless mesh network.

BACKGROUND

Traditionally, lighting devices are connected to each other and to a control switch using wires such that they can be controlled individually or as a group using the control switch. However, in environments that have a large number of lighting devices, such wired installations may be expensive. Further, the wired installations may be inflexible to changing lighting requirements of the environments.

Lighting devices with wireless transceivers do exist in the market, where the lighting devices can be arranged such that they form a network that can be controlled wirelessly. For example, the lighting devices may form a wireless mesh network (herein 'wireless network') that operate on a ZigBee protocol, where the lighting devices are nodes of the wireless network.

Currently, within the ZigBee protocol, there are two ways of sending a command (or a message) to a certain node in the wireless network. One of the ways to send a command to a node in the wireless network is using a unicast message where the message is only sent to that node. So, if a group of N devices were to be controlled at the same time, N messages would have to be individually sent to the N devices. Since there is an inherent delay between each unicast message that is transmitted and since every lighting device receives the unicast message at different times, different nodes may respond to the message at different times. In the case of the wireless network where the nodes are the lighting devices, the different response times result in a pop-corn effect which is undesirable. That is, the lighting devices change their state one by one as they receive their unicast message at different times and simultaneous control is not achieved.

The other way to send a command in the Zigbee protocol is the ZigBee broadcast where the message is sent to all the nodes that have been subscribed to a group. The nature of the ZigBee broadcast is such that the message is repeated by every node so that it propagates through the network. This creates unwanted congestion in the network and during rapid control (e.g., rapid switch-on and switch-off of lighting device nodes), the network can get so congested that no other commands can be sent out. This essentially renders the network unusable until the broadcasts settle down. Another downside of the broadcast method is that the nodes must know which group/zone they are a part of and every time the user re-configures a group/zone, the network controller/gateway must pass this information to the devices.

Therefore, there exists a need for technology that allows simultaneous and efficient control of a subnet of nodes in a wireless mesh network. It is noted that this background information is provided to reveal information believed by the applicant to be of possible relevance to the present disclosure. No admission is necessarily intended, nor should be construed, that any of the preceding information constitutes prior art against the present disclosure.

SUMMARY

In one aspect, the present disclosure relates to a system that includes a network controller and a plurality of nodes that are configured in a wireless mesh network. The plurality of nodes is communicatively coupled to the network controller. A node of a subset of nodes of the plurality of nodes is assigned as a point guard node. The point guard node is configured to receive a custom Zigbee unicast message from the network controller. The custom Zigbee unicast message includes a payload that comprises identifiers of one or more nodes of the subset of nodes and a control command for the one or more nodes. The network controller is configured to transmit the custom Zigbee unicast message in response to receiving an instruction to control the one or more nodes of the subset of nodes, and wherein the control command is associated with the instruction. Further, the point guard node is configured to generate an InterPAN broadcast message using the payload of the custom Zigbee unicast message; encrypt the InterPAN broadcast message to create an encrypted InterPAN broadcast message; and broadcast the encrypted InterPAN broadcast message to a remainder of the one or more nodes of the subset of nodes that are within a radio range of the point guard node.

In another aspect, the present disclosure relates to a computer readable medium stored in a network controller that is communicatively coupled to a plurality of nodes that form a wireless mesh network. The computer readable medium comprising instructions which when executed by a processor of the network controller system causes the network controller to perform a method that comprises receiving an instruction to control one or more nodes of a subset of nodes of the plurality of nodes. Responsive to receiving the instruction, the method comprises transmitting a custom Zigbee unicast message to a node of the subset of nodes. The custom Zigbee unicast message comprising a payload that comprises the instruction and identifiers associated with the one or more nodes of the subset of nodes that are to be controlled based on the instruction. the node of the subset of nodes is assigned as a point guard node that is configured to generate an InterPAN broadcast message using the payload of the custom Zigbee unicast message and broadcast the InterPAN broadcast message as a one hop broadcast message to a remainder of the one or more nodes of the subset of nodes that are within a radio range of the point guard node.

In yet another aspect, the present disclosure relates to a system that includes a plurality of lighting devices that form a wireless network and that are communicatively coupled to a network controller. A lighting device of a subset of lighting devices of the plurality of lighting devices is assigned as a primary point guard node. The primary point guard node is configured to receive a first custom Zigbee unicast message from the network controller. The first custom Zigbee unicast message comprises a first payload that comprises identifiers of one or more lighting devices of the subset of lighting devices and an instruction to control the one or more lighting devices. The identifiers of the one or more lighting devices in the first payload are arranged in a first order. The network controller is configured to transmit the first custom Zigbee unicast message in response to receiving the instruction to control the one or more lighting devices of the subset of lighting devices. Further, the primary point guard node is configured to generate a first InterPAN broadcast message using the first payload of the first custom Zigbee unicast message, and broadcast the first InterPAN broadcast message to a remainder of the one or more lighting devices of the subset of lighting devices that are within a radio range of the primary point guard node. At least one of the remainder of the one or more lighting devices is selected to re-broadcast the first InterPAN broadcast message based on a position of an identifier of the at least one of the remainder of the one or more lighting devices in the first payload of the first InterPAN broadcast message.

These and other aspects, objects, features, and embodiments, will be apparent from the following description and the appended claims.

BRIEF DESCRIPTION OF THE FIGURES

The foregoing and other features and aspects of the present disclosure are best understood with reference to the following description of certain example embodiments, when read in conjunction with the accompanying drawings, wherein.

Figure 1:
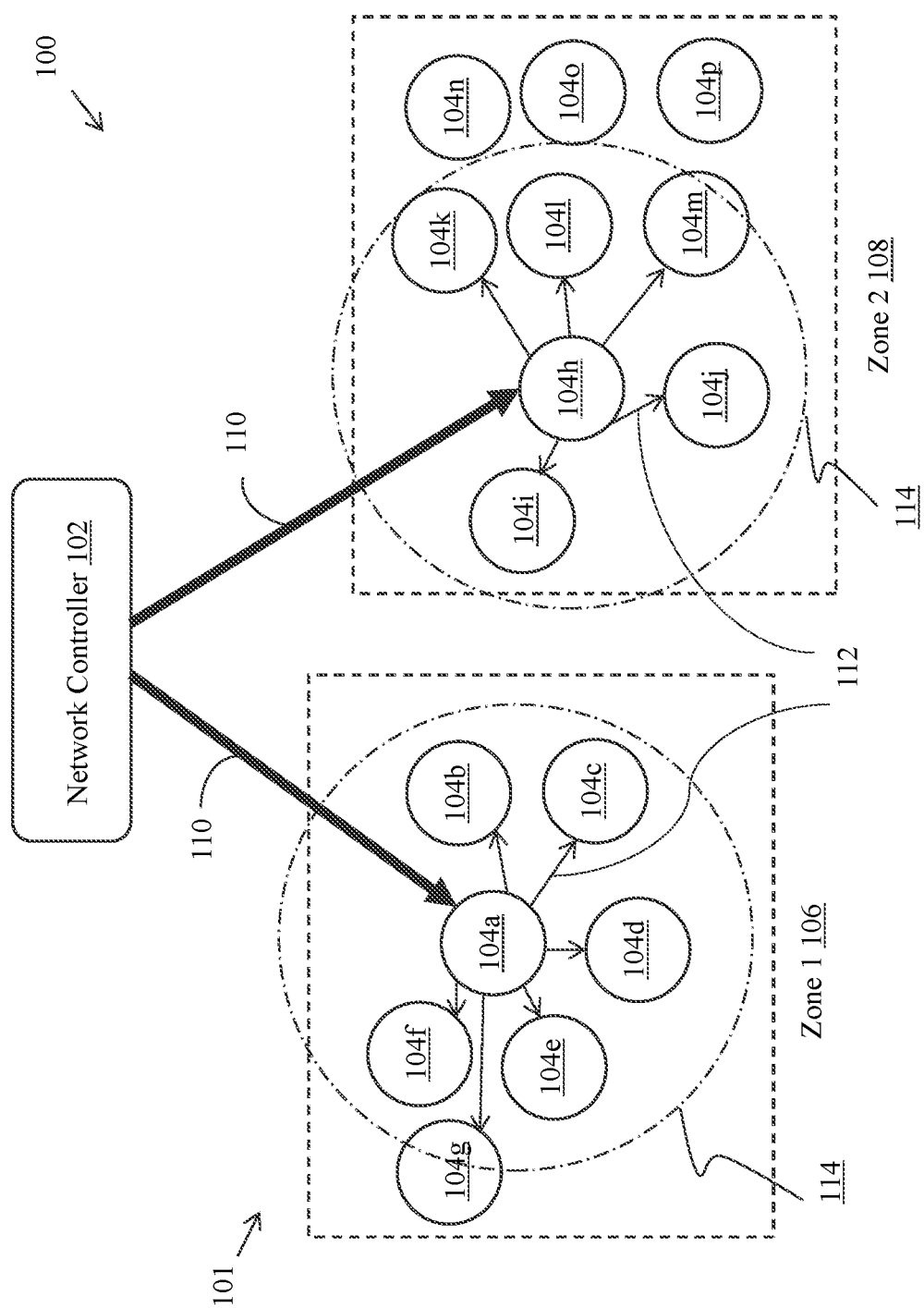
FIG. 1 illustrates an example operating system for simultaneous control of a subnet of nodes in a wireless network, in accordance with example embodiments of the present disclosure.

The drawings illustrate only example embodiments of the present disclosure and are therefore not to be considered limiting of its scope, as the present disclosure may admit to other equally effective embodiments. The elements and features shown in the drawings are not necessarily to scale, emphasis instead being placed upon clearly illustrating the principles of the example embodiments. Additionally, certain dimensions or positions may be exaggerated to help visually convey such principles.

DETAILED DESCRIPTION OF EXAMPLE EMBODIMENTS

The present disclosure describes a system, apparatus, and method that allows a near simultaneous control of the subnet of nodes in a wireless network. The system, apparatus, and method of the present disclosure minimize congestion, latency, and/or irregularity (pop-corn effect) associated with the control of a subset of nodes in a wireless network using traditional control mechanisms.

In one example embodiment, the system, apparatus, and method for simultaneous control of the subnet of nodes in a wireless network includes: (i) a plurality of nodes that forms the wireless network, and (ii) a network controller that is communicatively coupled to the plurality of nodes and a control device. The network controller operates as a gateway through which a control device communicates with and controls the plurality of nodes. The network controller maintains information regarding the plurality of nodes and subsets of the plurality of nodes that belong to one or more groups (zones) that are to be controlled simultaneously. In one example, the plurality of nodes of the wireless network includes lighting devices.

In said example embodiment, upon receiving a request to control a subset of the plurality of nodes that belong to a group, the network controller generates and transmits a unicast message to one of the nodes in the group that is assigned as a point guard node. In one example, the point guard node may be assigned manually by a user. In another example, the point guard node is randomly or automatically assigned by the network controller. In either case, a node that is substantially or most centrally located in the group is assigned as the point guard node. The unicast message is a custom Zigbee unicast message that includes a payload that comprises control instructions and the identifiers of one or more of the nodes in the group that need to act upon the control instructions. Upon receiving the unicast message, the point guard node generates and transmits/broadcasts an InterPAN broadcast message as a one hop broadcast message to one or more of a remainder of the nodes in the group that are in a radio range of the point guard node. The InterPAN broadcast message includes headers of a media access control layer and a physical layer of an 802.15.4 standard, and the payload from the unicast message. The InterPAN broadcast message is devoid of a Zigbee networking overhead which relieves the nodes receiving the Inter-PAN broadcast message from meeting the networking requirements and rules associated with the Zigbee protocol, thereby minimizing latency and/or congestion and facilitating near simultaneous control of the nodes in the group (which is a subset of the plurality of nodes in the wireless network).

The nodes in the group that are in the radio range of the point guard node and that receive the InterPAN broadcast message act upon the control instructions if an identifier of the node is present in the payload of the InterPAN broadcast message and is associated with the control instructions. Further, one or more of the nodes that receive the InterPAN broadcast message from the point guard node may re-broadcast the InterPAN broadcast message based on a position of the identifier of the one or more nodes in the payload of the InterPAN broadcast message.

In some examples, in addition to sending the unicast message to the point guard node (hereinafter 'primary point guard node'), the network controller sends another unicast message to another node in the group that is assigned as a back-up point guard node. The unicast message that is sent to the back-up point guard node is substantially similar to the unicast message sent to the primary point guard node except that the order of the node identifiers in the payload of the unicast message to the back-up point guard node is different from the order of the node identifiers in the payload of the unicast message to the primary point guard node. The difference in the order of the node identifiers in the payload of the unicast message to the primary point guard node and the back-up point guard node creates different sets of re-broadcast nodes, which in turn adds redundancy and improves overall efficiency.

If the primary point guard is disabled or is not operational, the network controller stops all communications with the primary point guard node till the primary point guard node becomes operational again or till a user assigns another node in the group as a primary point guard node. While the network controller waits for the primary point guard node to become operational again or till the time that the user assigns another node in the group as a primary point guard node, the network controller sends unicast messages to each of the nodes in the group as a fail-safe mechanism.

The term 'subnet' as used herein may generally refer to a sub-network, i.e., a subset of the nodes of a wireless network that are to be controlled in a near simultaneous manner. Further, the term 'InterPAN broadcast message' or 'Inter-PAN message' as used herein may generally refer to a data packet that is sent from one node to another node in a wireless personal area network or from a node in a wireless personal area network to another node in another wireless personal area network, e.g., 802.15.4 networks. The Inter-PAN message may be interchangeably referred to as an Inter-PAN message or Inter Personal Area Network message without departing from a broader scope of the present disclosure. The InterPAN broadcast message described herein may include the PHY and MAC layer headers of the IEEE 802.15.4 networks but are devoid of the Zigbee layer higher layer protocols, such as network layer, application layer, and so on.

Figure 2A:
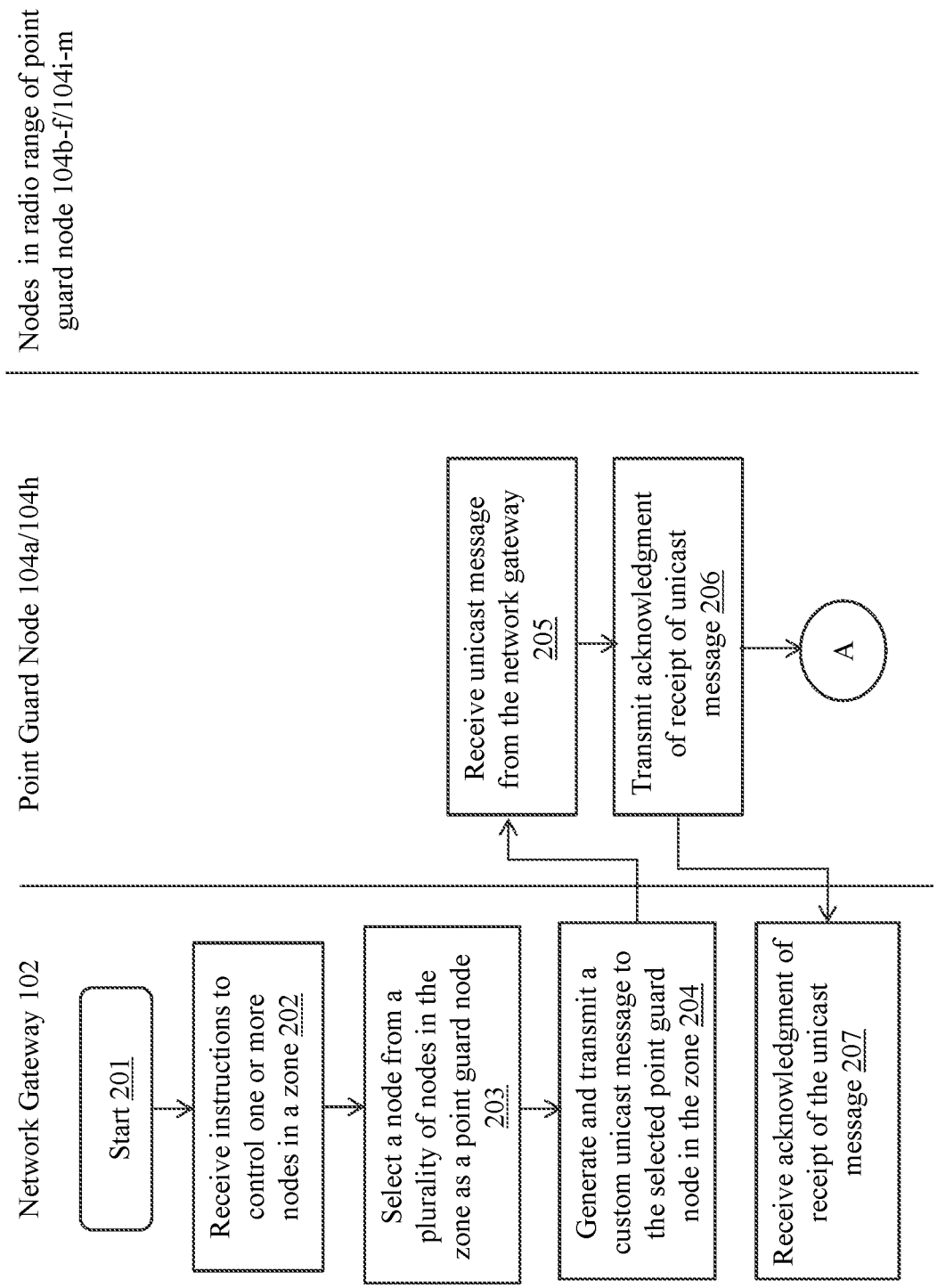
FIGS. 2A-2C ('collectively FIG. 2') comprise a flowchart that illustrates an example method of simultaneous control of a subnet of nodes in a wireless network, in accordance with example embodiments of the present disclosure.
Figure 2B:
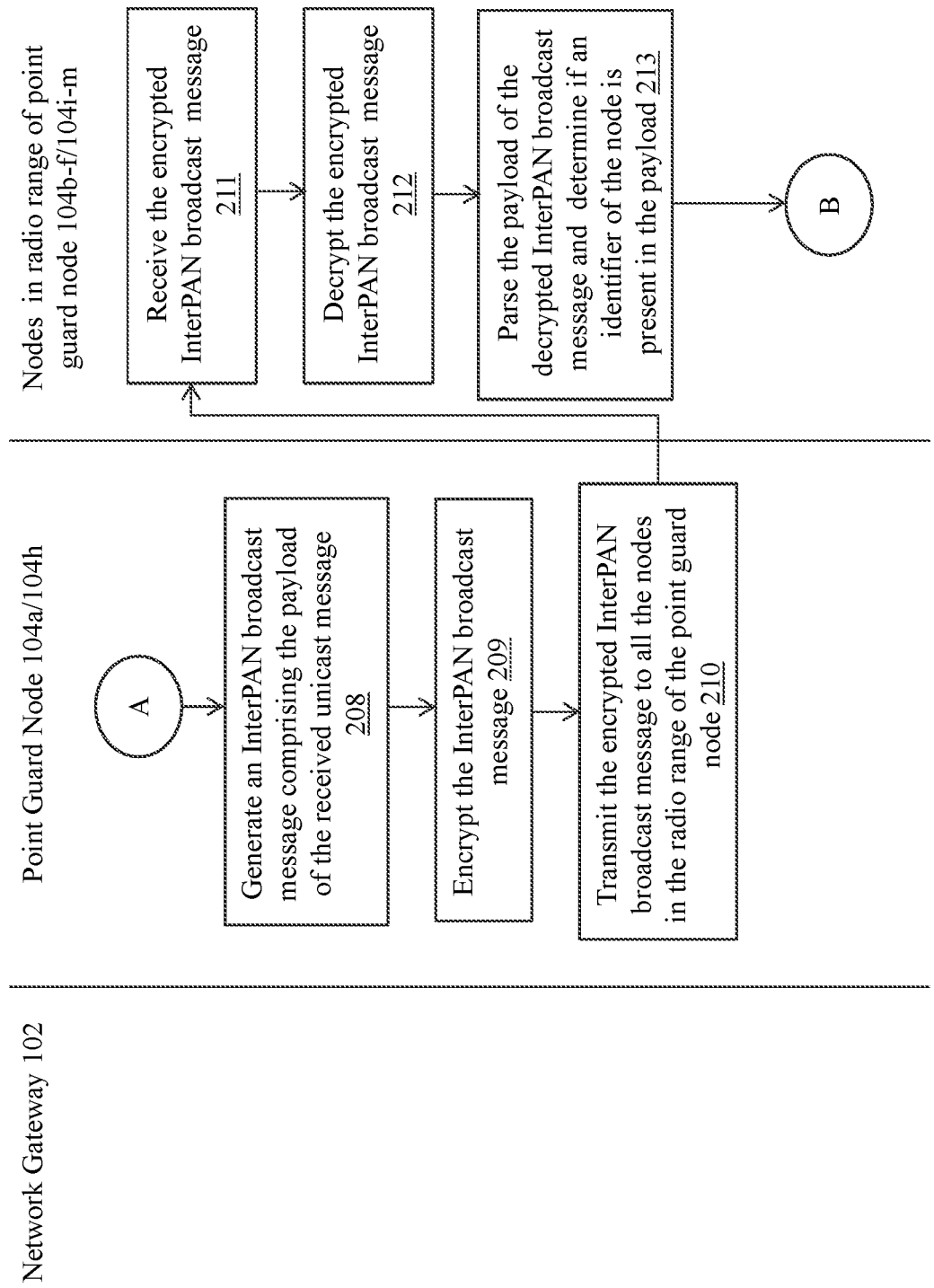
Figure 2C:
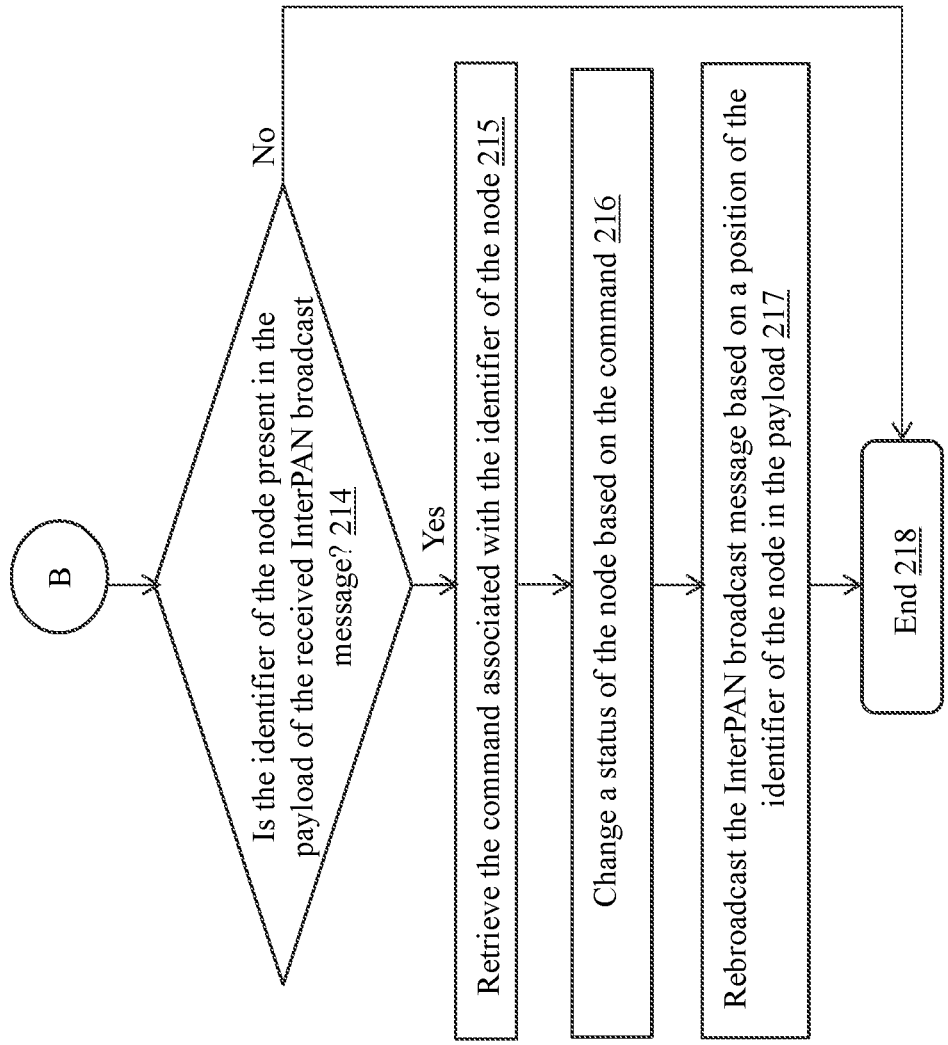

Turning now to the figures, example embodiments of simultaneous control of the subset of nodes in a wireless network will be described in association with FIGS. 1-4. FIGS. 1 and 2 will be described in association with an example embodiment of simultaneous control of the subset of nodes in a wireless network, FIGS. 3 and 4 will be described in association with another example embodiment of simultaneous control of the subset of nodes in a wireless network.

Referring to FIG. 1, a system 100 may include a plurality of nodes 104a-p that are configured to form a wireless network 101 (e.g., wireless mesh network). In the example embodiment illustrated in FIG. 1 and described herein, the plurality of nodes 104a-p may include lighting devices having wireless communication capabilities (e.g., wireless communication radio/transceiver, processors, etc.). However, in other example embodiments, the plurality of nodes 104a-p may include any other appropriate devices with wireless communication capability, such as, but not limited to, electronic devices, window blind/curtain controller, sensors, mobile computing devices, etc. Even though FIG. 1 illustrates a certain number of nodes, one of skill in the art can understand that the system can include more or fewer nodes without departing from a broader scope of the present disclosure.

Figure 3:
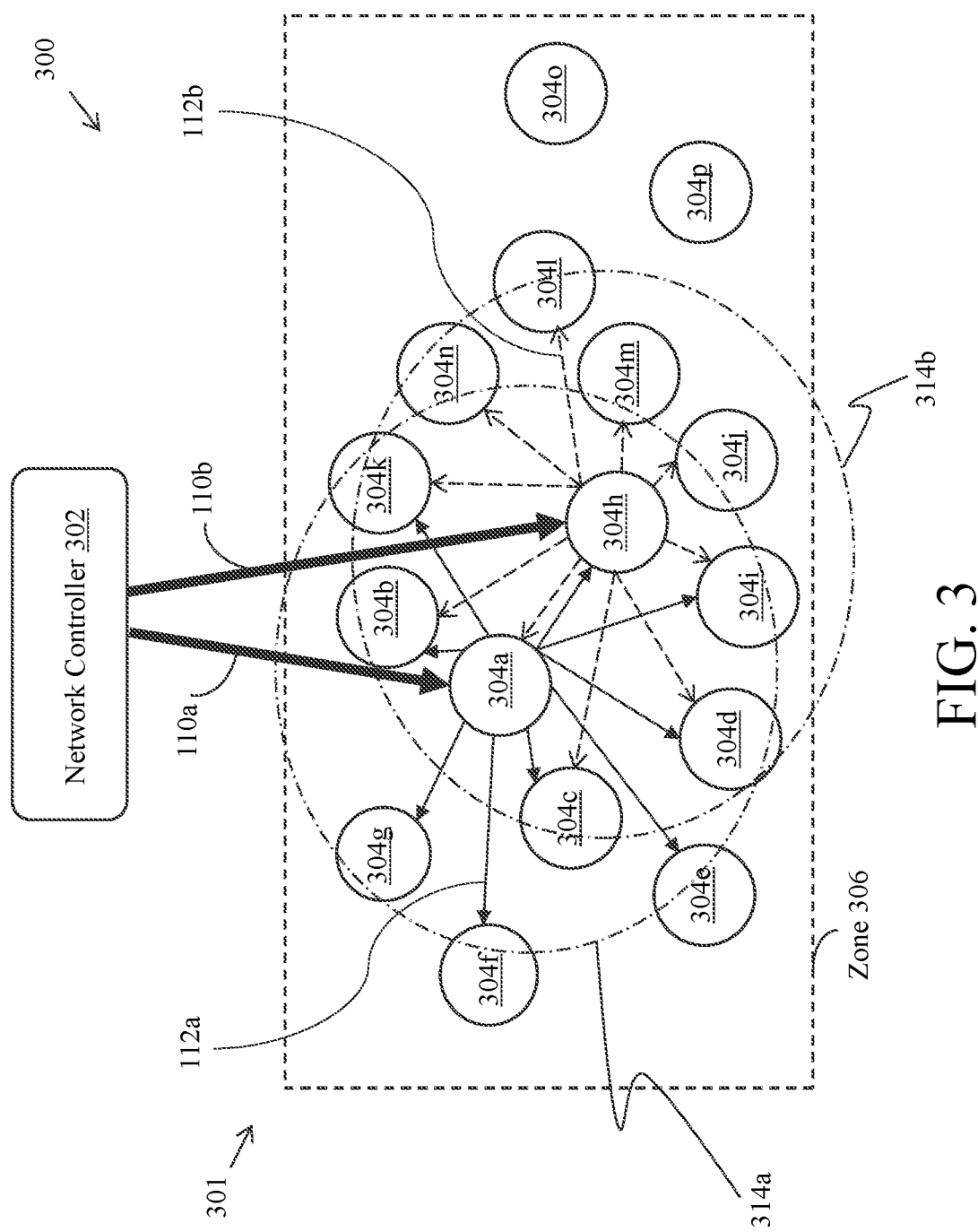
FIG. 3 illustrates another example operating system for simultaneous control of a subnet of nodes in a wireless network, in accordance with example embodiments of the present disclosure.
Figure 4A:
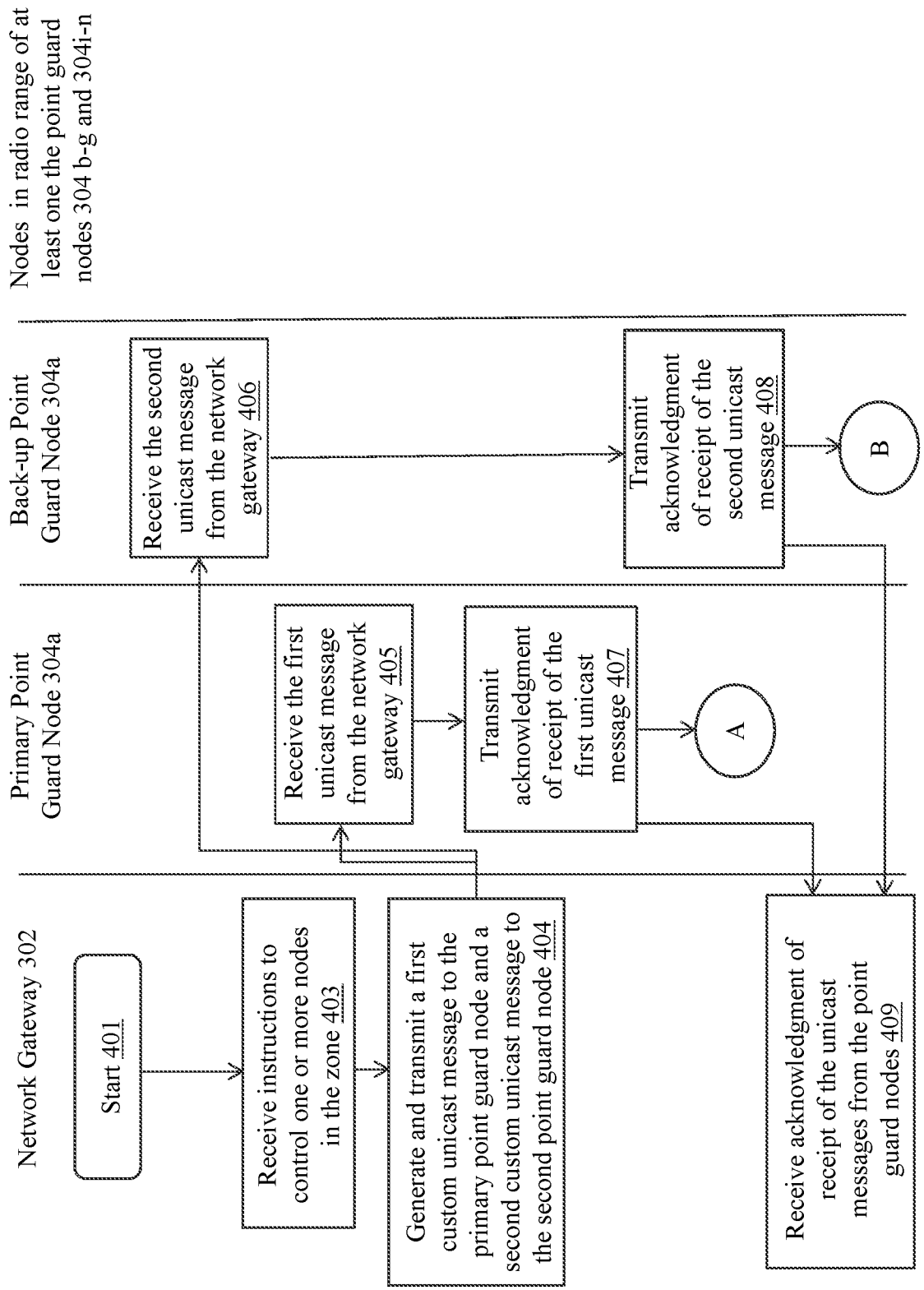
FIG. 4A-4F ('collectively FIG. 4') comprise a flowchart that illustrates another example method of simultaneous control of a subnet of nodes in a wireless network, in accordance with example embodiments of the present disclosure.
Figure 4B:
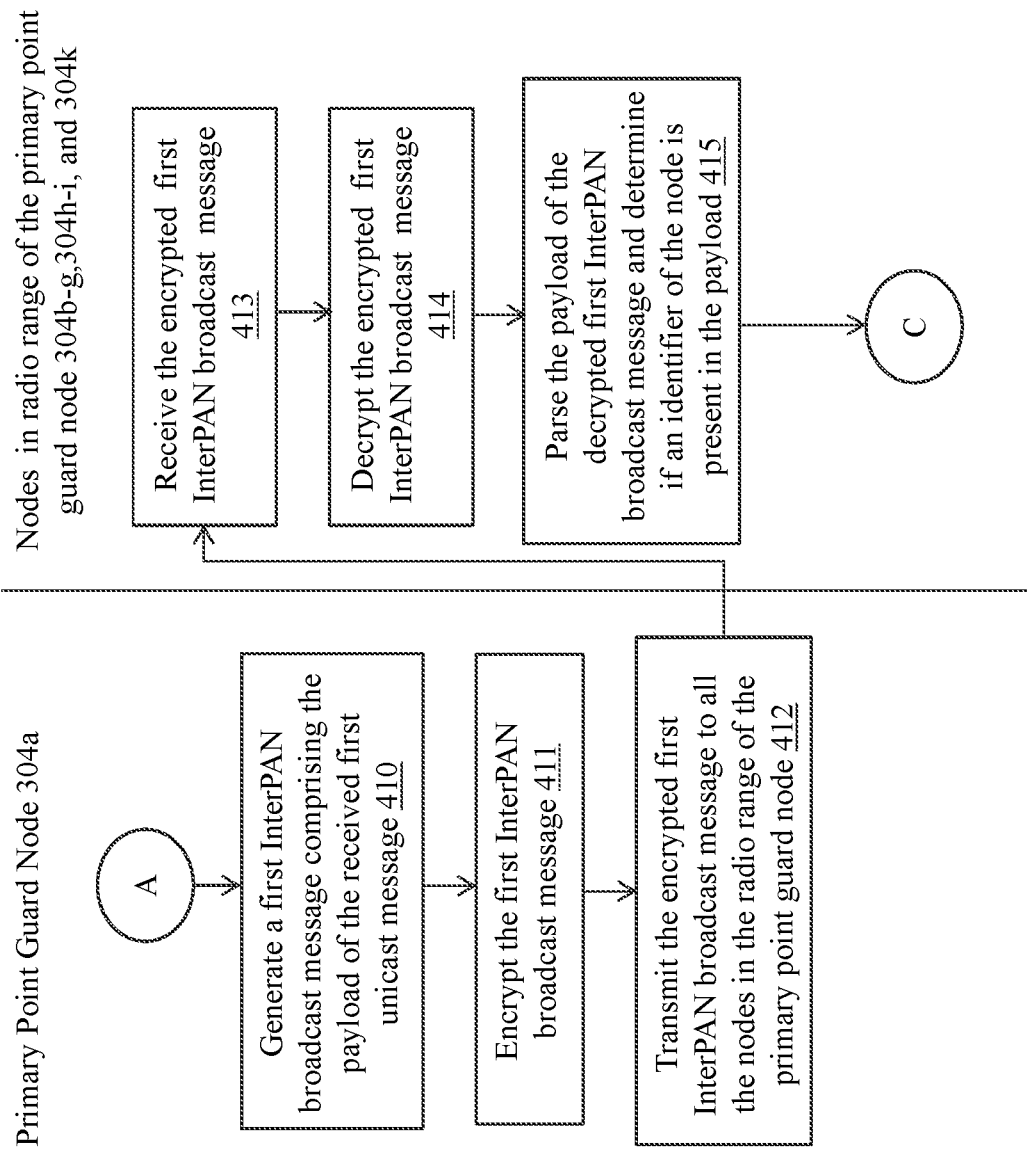
Figure 4C:
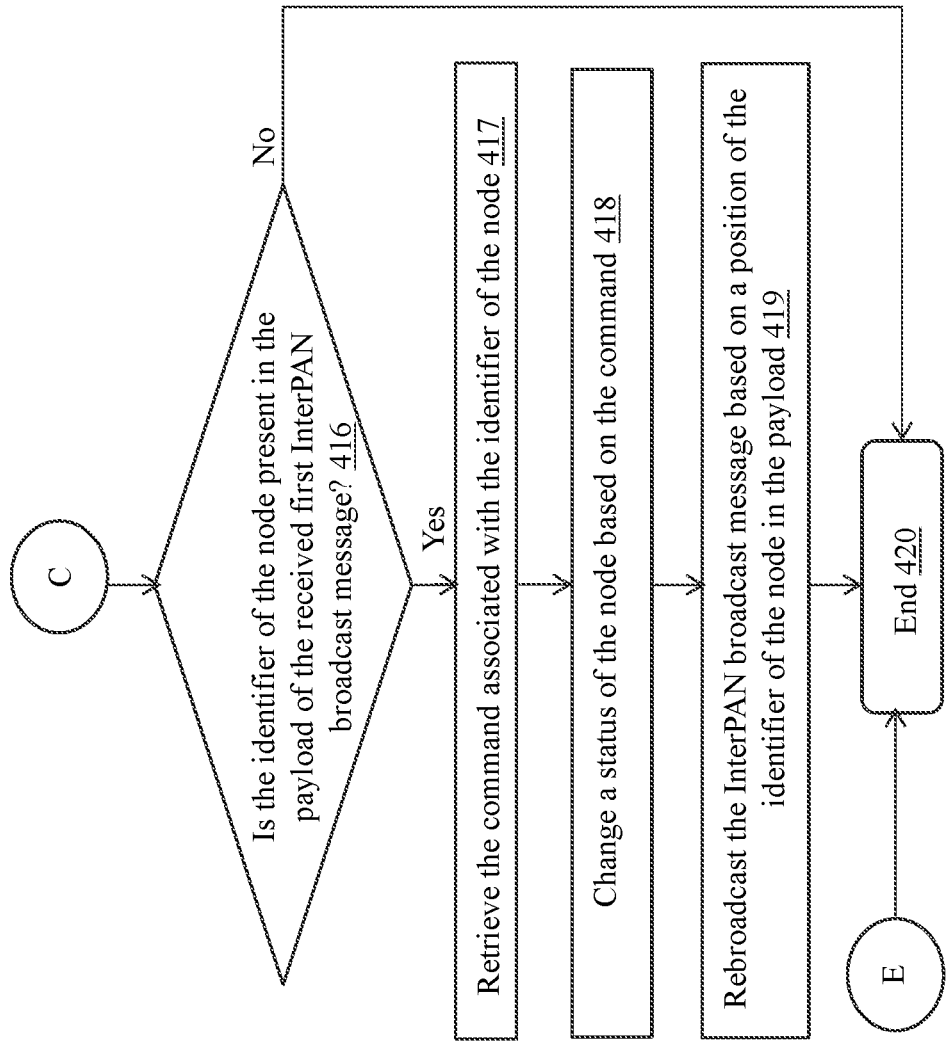
Figure 4D:
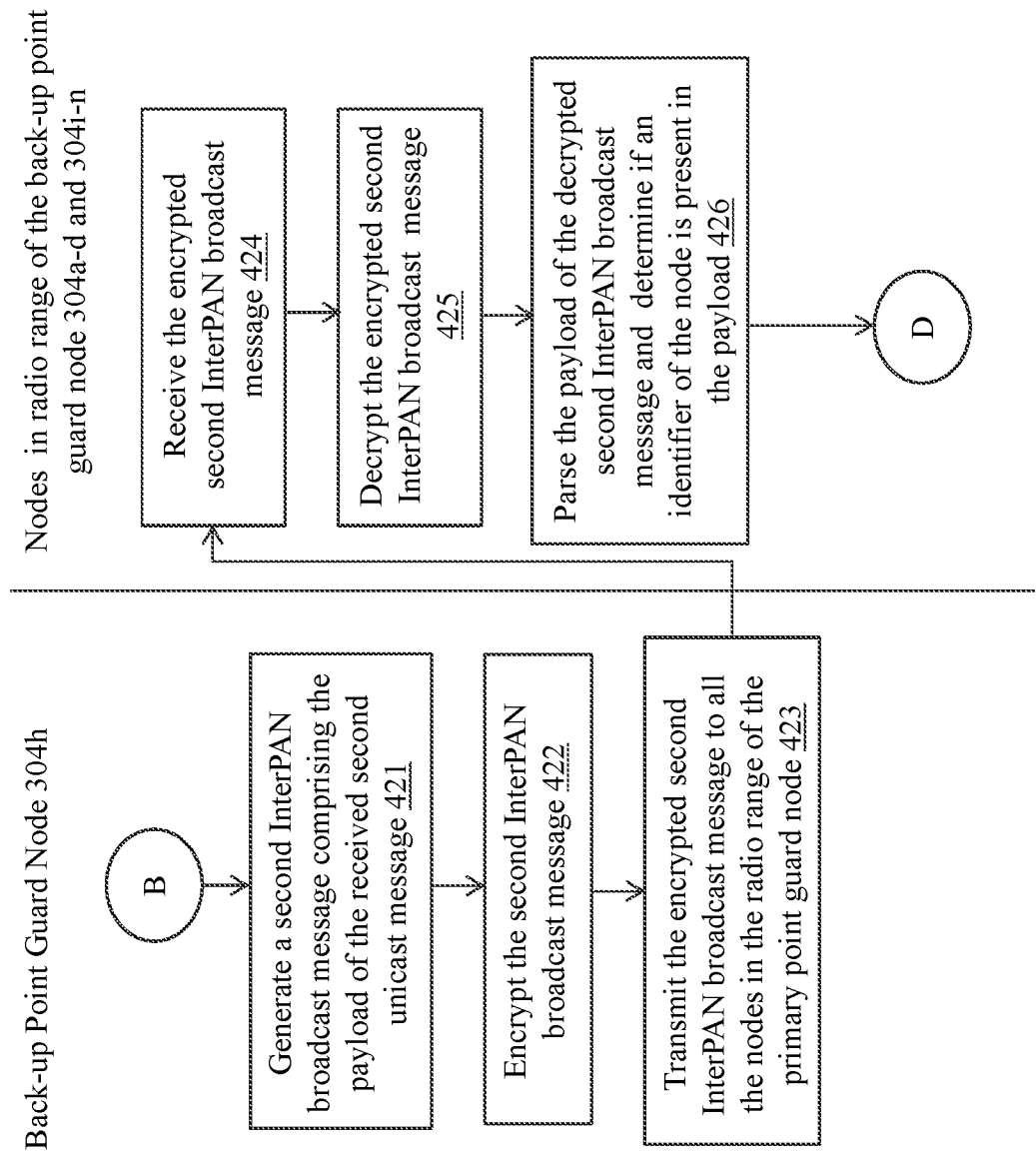
Figure 4E:
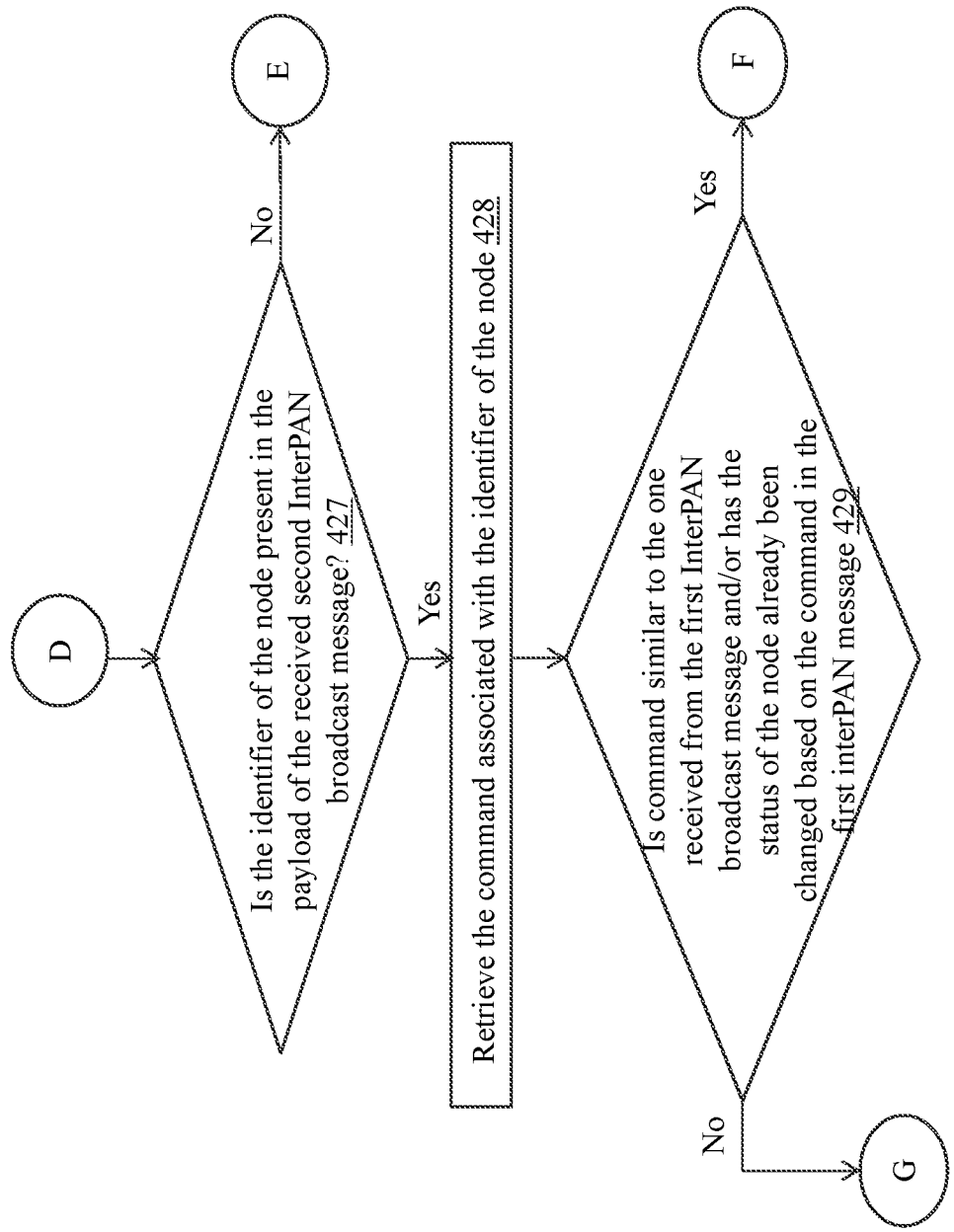
Figure 4F:
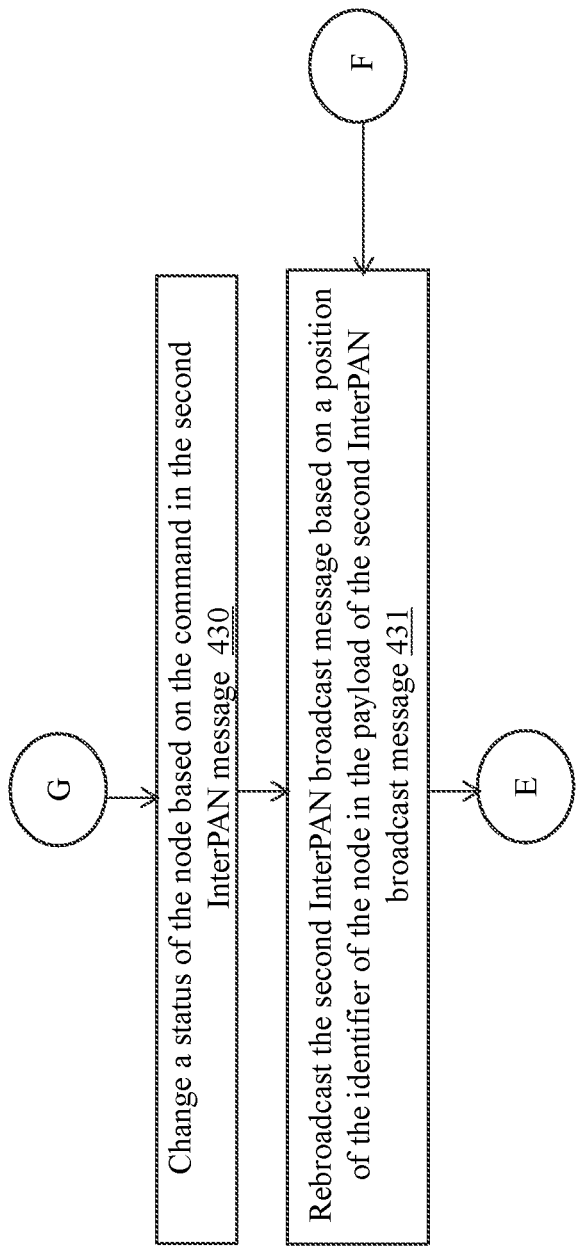

As illustrated in FIG. 1, the plurality of nodes 104a-p may be categorized into two zones, e.g., zone 1 106 and zone 2 108. The term 'zone' as used herein may generally refer to a group of devices that are to be controlled together. Once the wireless network 101 is commissioned, a user (or the commissioner) may create the different zones based on the nodes that the user desires to control together and/or nodes that the user wants to act nearly simultaneously as a group. In the example embodiment of FIG. 1, the user may categorize a first subset of the plurality of nodes, e.g., nodes 104a-g, into zone 1 106, and a second subset of nodes, e.g., nodes 104h-p into zone 2 108. Even though FIG. 1 illustrates the plurality of nodes 104a-p as being categorized into two zones (106, 108), one of skill in the art can understand and appreciate that in other example embodiments, the plurality of nodes 104a-p may be categorized into fewer or more zones without departing from a broader scope of the present description. For example, as illustrated in FIG. 3, the plurality of nodes 104a-p may be categorized into a single zone, i.e., zone 306. FIG. 3 will be described further below in association with another example embodiment of the simultaneous control of the subnet of nodes in a wireless network.

As illustrated in FIG. 1, in addition to the plurality of nodes 104a-p that are categorized in the different zones 106 and 108, the system 100 may include a network controller 102 that operates as a central gateway through which communications may be transmitted to and/or from the nodes 104a-p. That is, user commands or interaction with a node may be received by the network controller 102 and transmitted to the node through the network controller 102. For example, if a user turns on a switch to control a subset of the nodes 104a-g (e.g., lighting devices), the signal from the switch is received by the network controller 102 and then transmitted to the nodes 104a-g via the network controller 102. Further, the network controller 102 may be configured to form the wireless network 101 by making the nodes 104a-p join the wireless network 101. Furthermore, the network controller 102 may be configured to select a security mode for the network, authenticate new nodes, distribute network keys to new nodes, etc. Additionally, the network controller 102 may be configured to maintain a record of the plurality of nodes 104a-p (e.g., list of node identifiers), different zones (106, 108), and to which zone each node 104a-p belongs, i.e., the associations of the nodes 104a-p to the zones (106, 108). Accordingly, the nodes 104a-p do not have to be aware of the zone(s) to which they belong and therefore do not have to be notified about the same. In some example embodiments, the network controller 102 may be a device similar to that of a Zigbee coordinator and configured to execute functions similar to that of the Zigbee coordinator along with the additional functions that are described above.

The network controller 102 may include one or more radios for wireless communication with the nodes 104a-p. In one example embodiment, the radios may be configured for wireless communication using the IEEE 802.15.4 standard. However, in other example embodiments, the radios may be configured for wireless communication based on any other appropriate wireless communication standard without departing from a broader scope of the present disclosure. Furthermore, in some example embodiments, the network controller 102 may be communicatively coupled with a user interface via a wired or a wireless communication link. The user interface may be configured to receive user inputs to control one or more of the plurality of nodes 104a-p. In other example embodiments, instead of or in addition to the user input, the nodes 104a-p may be controlled based on signals from another device(s), such as one or more occupancy sensors. Accordingly, the network controller 102 may be communicatively coupled with the other device via a wired or a wireless communication link.

Example operations associated with the simultaneous control of a subnet of nodes in a wireless network 101 will be described in greater detail below in association with FIG. 2. FIG. 2 will be described by making reference to FIG. 1. FIG. 2 illustrate flowcharts associated with the operation of the system for simultaneous control of a subnet of nodes in a wireless network 101. Although specific operations are disclosed in the flowcharts illustrated in FIG. 2, such operations are only non-limiting examples. That is, embodiments of the present invention are well suited to performing various other operations or variations of the operations recited in the flowcharts. It is appreciated that the operations in the flowcharts illustrated in FIG. 2 may be performed in an order different than presented, and that not all of the operations in the flowcharts may be performed.

All, or a portion of, the embodiments described by the flowcharts illustrated in FIG. 2 can be implemented using computer-readable and computer-executable instructions which reside, for example, in a memory or a computer readable medium of the network controller 102 and/or the nodes 104a-p. As described above, certain processes and operations of the present disclosure are realized, in one embodiment, as a series of instructions (e.g., software programs) that reside within computer readable memory or computer readable medium of a computer system and are executed by the processor of the computer system. When executed, the instructions cause the computer system to implement the functionality of the present invention as described below.

Referring to FIG. 2, the operation of the system for simultaneous control of a subnet of nodes in a wireless network 101 begins at step 201 and proceeds to step 202 where the network controller receives instructions to control one or more nodes in a zone, e.g., nodes 104a-g in zone 1. In one example embodiment, the instructions may be received from a mobile application (web service) on a mobile computing device based on commands input by a user on a mobile computing device. The instructions may be received from the mobile computing device via a network, such as the Internet, private network, etc., to which the network controller 102 may be connected. In another example, the instructions may be received from other devices, such as an occupancy sensor, based on a change in status of the other devices. For example, instructions to control a subnet of nodes in an area may be issued by an occupancy sensor when the occupancy sensor detects the presence of occupants in the area that is monitored by the occupancy sensor. One of ordinary skill in the art can understand and appreciate that the network controller may receive instructions to control the subnet of nodes from any other appropriate device or source, such as a wall switch, etc., without departing from a broader scope of the present disclosure. Further, example instructions to the nodes 104a-p may include, but are not limited to, powering on the nodes, powering down the nodes, changing a status of the nodes (dimming the light), switching to a power saving mode, etc.

Responsive to receiving the instructions, in step 203, the network controller 102 selects one of the nodes 104a-g in the zone 106 as its destination candidate, i.e., the node with which the network controller 102 communicates. For example, in the example embodiment of FIG. 1, the node that is selected as the destination candidate in zone 1 is node 104a. Similarly, the node that may be selected as the destination candidate in zone 2 is node 104h. The node that is selected by the network controller 102 as the destination candidate may be referred to as a point guard node. Alternatively, in some example embodiments, the point guard node for a zone may be selected or assigned prior to receiving the instructions to control one or more nodes in a zone.

It is noted that the point guard nodes 104a in zone 1 and 104h in zone 2 as shown in FIG. 1 are examples, and in other examples, any other appropriate node within a zone may be chosen as the point guard node for the zone without departing from a broader scope of the present disclosure. Since any of the nodes within a zone can be chosen as a point guard node for the zone, the system 100 has no single point of failure because the network controller 102 can switch the point guard node as and when needed.

In one example embodiment, the network controller 102 is configured to randomly choose any node within a zone as the point guard node for the zone. However, in other example embodiments, the network controller 102 may be configured to choose the point guard node based on an appropriate logic. Example logic based on which the network controller 102 may include, but is not limited to, selecting a point guard node based on how central a node is within the zone or the node having the highest received signal strength indication (RSSI) value among its neighbors. That is, even though any node in the zone can be selected or assigned as the point guard node, preferably, the network controller 102 may be configured to select or assign the most centrally located node in the zone as the point guard node. In some example embodiments, the network controller 102 may choose a node that has the most neighboring nodes of the zone within its radio range 114 to be the point guard node. In other example embodiments, a user (or commissioner) may manually assign one of the nodes (e.g., a centrally located node) in a zone as the point guard node for the zone using a mechanism that is provided to the user to make such as selection.

In either case, once the point guard node is selected, in step 204, the network controller generates and transmits a single custom Zigbee unicast message 110 to the point guard node 104a. If the point guard node is assigned before receiving the instructions (control instructions), the step 203 of assigning the point guard node after receiving the instructions may be omitted. The payload of the custom Zigbee unicast message 110 may include, but is not limited to, the control instruction (e.g., dim the lights, turn on the lights, turn off the lights, etc.) that was received by the network controller 102 and a list of identifiers of all the nodes within the zone (e.g., zone 1 106) that should act on the control instruction. It is noted that not all the nodes in the zone may be required to act on the control instruction. Further, in some example embodiments, multiple instructions may be provided to the nodes of a zone using a same unicast message 110 without departing from a broader scope of the present disclosure. For example, when a projector presentation is to be made in a room having lighting devices represented by nodes 104a-f and a window blind controller represented by node 104g, a user may instruct the lighting devices and blinds to be switched to presentation mode. In said example, some of the lighting device nodes, e.g., nodes 104 e-f may be next to a window that lets in daylight. Accordingly, in said example, in the unicast message, the identifiers of nodes 104a-d may be associated with a first instruction to dim the lights to 30%, while the identifiers of nodes 104e-f may be associated with a second instruction to either turn off or dim the lights to 10% and the identifier of the node 104g may be associated with a third instruction to close the blinds on the window. In said example, upon receiving the instruction to switch the nodes 104a-g of the room to a presentation mode, the network controller 102 may be configured to discern and generate the three different instructions that are to be associated with the different nodes and include them in the single custom unicast message 110. A memory of the network controller 102 may include the instructions associated with a presentation mode stored therein. Alternatively, the instruction to switch the nodes 104a-g of the room to a presentation mode may include within itself the three instructions for the different nodes. In yet another example, instead of sending multiple instructions in one unicast message 110, separate unicast messages 110 may be sent for each instruction. That is, in said example, three unicast messages 110 may be sent for conveying the three instructions to the different set of nodes of the zone.

In step 205-207, the point guard node (e.g., node 104a of zone 1) receives the single custom Zigbee unicast message 110 from the network controller 102 and sends an acknowledgement of the receipt of the unicast message 110 back to the network controller 102. In some example embodiments, operations 206-207 may be omitted, i.e., there may be no acknowledgement of the receipt of the unicast message 110. In some example embodiments, if communication cannot be established with the selected point guard node 104a or if the network controller 102 does not receive acknowledgment from the point guard node or if the point guard node 104a is disabled or not operational, the network controller 102 may stop all communications to the point guard node 104a till the point guard node 104a becomes operational again or a user manually selects/assigns another node in the zone as a point guard node. In some example embodiments, instead of a manual selection or assignment, if the point guard node 104a (i.e., initially assigned point guard node) is disabled or not operational, the network controller 102 automatically selects or assigns another node in the zone as the new point guard node to transmit the unicast message 110.

Till the new point guard node of the zone is assigned or till the initial point guard node 104a becomes operational, the network controller 102 may be configured to transmit unicast messages to each node (e.g., nodes 104a-f) in the zone (e.g., zone 1 106) as a fail-safe mechanism.

If the point guard node 104a is operational, responsive to receiving the unicast message 110, in step 208, the point guard node 104a strips the payload from the unicast message 110 and generates an InterPAN broadcast message 112 with the payload of the unicast message 110. The InterPAN broadcast message 112 is a message that is devoid of ZigBee networking overhead. That is, the InterPAN broadcast message 112 uses only the media access control (MAC) and the physical (PHY) layer headers of the 802.15.4 standard without any of the protocols/specifications of the higher Open System Interconnection (OSI) layers, e.g., network layer, application layer, etc., that are defined specifically by and for the Zigbee standard. One of skill in the art understands and appreciates that the Zigbee standard defines the higher layers of the system by building on the PHY and MAC layers defined by the 802.15.4 standard. Since, the InterPAN broadcast message 112 uses only the MAC and the PHY layer headers of the 802.15.4 standard and is devoid of ZigBee networking overhead, the InterPAN broadcast message is not subject to any ZigBee networking rules/restriction.

Once the InterPAN broadcast message is generated, in step 209, the point guard node 104a is configured to encrypt the InterPAN broadcast message 112 using a network key that is known to all the nodes 104a-g in the zone 106. In one example embodiment, the InterPAN broadcast message 112 is secured by the same network key that is used in ZigBee, so no additional security overhead is added. The encryption may be an AES encryption, however, in other example embodiments, any other appropriate encryption may be used to secure the InterPAN broadcast message 112 without departing from a broader scope of the present disclosure. The encryption provides security to the wireless network 101 and the wireless network 101 is not susceptible to malicious messages introduced by any rogue device(s).

In step 210, the point guard node 104a broadcasts the encrypted InterPAN broadcast message 112 as a one hop broadcast message since the InterPAN broadcast message does not fall within the Zigbee specification. Accordingly, only nodes 104b-g within radio range of the transmitter node, i.e., the point guard node 104a would hear/receive the InterPAN broadcast message 112. In other words, in step 211, all the nodes 104b-g within the radio range 114 of the point guard node 104a may receive the InterPAN broadcast message 112.

Responsively, in step 212, the nodes 104b-g that received the InterPAN broadcast message 112 may decrypt the encrypted InterPAN broadcast message 112 using the network key. If the encrypted InterPAN broadcast message 112 cannot be decrypted or if a node determines that the InterPAN broadcast message 112 has been corrupted (sent by malicious transmitter), the broadcast message 112 may be dropped. However, if the broadcast message 112 is decrypted, in steps 213-216, the nodes 104b-g may quickly parse the payload of the broadcast message 112 to determine if the identifier of the node is present in the payload. If the identifier of the node is present in the payload, the respective node may process the payload to determine the control instruction associated with the identifier of the node. This ensures that only concerned devices which belong to the concerned zone, act on the message. Responsive to determining the control instruction associated with the identifier of the node, the respective node may act on the control instruction and change a status of the node as instructed in the control instruction.

In some example embodiments as illustrated in FIG. 1, all the remaining nodes 104b-g of a zone 106 may lie within the radio range 114 of the point guard node 104a of the zone 106. However, in other example embodiments, all the remaining nodes 104h-p of a zone, e.g., zone 2 108 do not lie within the radio range 114 of the point guard node 104h of zone 2 108. In zone 2, some of the nodes, e.g., nodes 104n-p may lie outside the radio range 114 of the point guard node 104h of the zone 108. In the example embodiment of zone 2 108, a certain number of the nodes 104i-m that are in the radio range 114 of the point guard node 104h and that receive the InterPAN broadcast message 112 from the point guard node 104h may be selected to re-broadcast the InterPAN broadcast message 112 one more time so that the remaining nodes 104n-p that are outside the radio range 114 of the point guard node 104h receive the InterPAN broadcast message 112 as well. Redundancy and reliability are achieved through the re-broadcasting.

Since the InterPAN broadcast message 112 does not fall within the Zigbee specification and is devoid of ZigBee networking overhead, all the nodes that receive the InterPAN broadcast message 112 are not required to re-broadcast the InterPAN broadcast message 112. Instead, only a few selected nodes have to re-broadcast in selected occasions and not all the time. In one example, based on the size of the list in the payload, the receiving nodes 104b-g or 104i-m check their position in the list of node identifiers in the payload. Nodes in certain positions, e.g., 10th, 15th, and 30th positions in the payload would be chosen for rebroadcast. All the nodes are pre-programmed to know their positions in the received payload list based on the size of the payload list. In some example embodiments, instead of re-broadcasting, a network controller 102 may choose more than one point guard node within a zone. The number of nodes under the control of a point guard node may be determined based on a limit on the payload size of the 802.15.4 InterPAN broadcast message and/or the unicast message.

Since the InterPAN broadcast message bypasses the standard Zigbee protocol and is devoid of the overhead of the Zigbee layer, the receiving nodes do not have to conduct any Zigbee checks as to whether the Zigbee rules are followed, which in turn reduces the latency in the wireless network 101 and makes the wireless network 101 more robust than when a standard Zigbee communication protocol is followed. That is, the system 100 of the present disclosure improves over an existing wireless network (e.g., wireless mesh network) in terms of latency and robustness of the network. Further, the reduced latency allows near simultaneous control of a subnet of the nodes in the wireless network 101, which would drastically improve visual feedback (when the nodes are lighting devices, for example) and enhance user experience. That is, near simultaneous control is realized as all nodes receive the broadcast at the same time. Also, the over-head on an InterPAN broadcast message 112 is significantly less than a ZigBee message so even the re-broadcast goes out very close in time to the original broadcast. Furthermore, in the system 100 of the present disclosure, the nodes 104a-p of the wireless network 101 do not need to remember their configuration as that is included as part of the payload and can be changed at any point per a user's choice.

Turning to FIGS. 3-4, another example embodiment of simultaneous control of the subnet of nodes in a wireless network will be described in detail in the following paragraphs. Referring to FIG. 3, a system 300 may include a plurality of nodes 304a-p that are configured to form a wireless network 301 (e.g., wireless mesh network). The system 300 may further include a network controller 302 that is communicatively coupled to the plurality of wireless nodes 304a-p and configured to operate as a central gateway through which communications may be transmitted to and/or from the nodes 304a-p. The plurality of nodes 304a-p and the network controller 302 of FIGS. 3-4 may be substantially similar to the plurality of nodes 104a-p and the network controller 102 of FIGS. 1-2 that are described above in detail in association with FIGS. 1-2. Accordingly, only the differences in the arrangement, structure, and/or functionality between the plurality of nodes 304a-p and the network controller 302 of FIGS. 3-4 and the plurality of nodes 104a-p and the network controller 102 of FIGS. 1-2 will be described herein for the sake of brevity.

As illustrated in FIG. 3, the plurality of nodes 304a-p may be assigned to a single zone, e.g., zone 306. A user or a commissioner who commissions the nodes 304a-p of the wireless network 101 may assign the nodes 304a-p into zones based on the nodes that the user desires to control together and/or nodes that the user wants to act nearly simultaneously as a group. So, even though FIG. 3 illustrates the plurality of nodes 304a-p as belonging to a single zone, i.e., zone 306, one of skill in the art can understand and appreciate that the plurality of nodes 304a-p can be categorized into any number of zones as desired by the user or commissioner.

Further, as illustrated in FIG. 3, two of the plurality of the nodes 304a-p in the zone 306 may be assigned as point guard nodes (304a and 304h). One of the point guard nodes, e.g., node 304a may be assigned as primary point guard node, while the other point guard node, e.g., node 304h may be assigned as back-up point guard node. Assigning two point guard nodes (e.g., nodes 304a and 304h) within the same zone (e.g., zone 306) instead of only one point guard node may result in an increase in reliability of the network and redundancy in the network. As described above in association with FIGS. 1-2, the point guard nodes (304a, 304h) may be either manually assigned by a user or automatically assigned by the network controller 302. The network controller 302 may assign the point guard nodes based on communication signal parameters, e.g., received signal strength indicators (RSSI) associated with the nodes of the zone. In either case, the nodes of the zone 306 that are most centrally located within the zone 306 or the nodes that have most number of neighboring nodes within its radio range may be chosen as the point guard node, e.g., nodes 306a and 306h.

An example method associated with the system 300 for simultaneous control of a subnet of nodes in a wireless network will be described in greater detail below in association with FIG. 4 by referring to FIG. 3 as needed. FIG. 4 illustrates flowcharts associated with the operation of the system 300 for simultaneous control of a subnet of nodes in a wireless network 301. Although specific operations are disclosed in the flowcharts illustrated in FIG. 4, such operations are only non-limiting examples. That is, embodiments of the present invention are well suited to performing various other operations or variations of the operations recited in the flowcharts. It is appreciated that the operations in the flowcharts illustrated in FIG. 4 may be performed in an order different than presented, and that not all of the operations in the flowcharts may be performed.

All, or a portion of, the embodiments described by the flowcharts illustrated in FIG. 4 can be implemented using computer-readable and computer-executable instructions which reside, for example, in a memory or computer readable medium of the network controller 302 and/or the nodes 304a-p. As described above, certain processes and operations of the present disclosure are realized, in one embodiment, as a series of instructions (e.g., software programs) that reside within computer readable memory of a computer system and are executed by the processor of the computer system. When executed, the instructions cause the computer system to implement the functionality of the present invention as described below.

Turning to FIG. 4, the operation of the system 300 for simultaneous control of a subnet of nodes in a wireless network 301 begins at step 401 and proceeds to step 403 where the network controller 302 receives control instructions (e.g., dim the lights, turn on the lights, turn off the lights, etc.) to control one or more nodes in a zone, e.g., one or more of the nodes 304a-p in zone 306. Provided that the primary and back-up point guard nodes (304a, 304h) have already been assigned, upon receiving the control instructions, in step 404, the network controller 302 may generate and transmit a first custom Zigbee unicast message 110a to the primary point guard node 304a of the zone 306 and a second custom Zigbee unicast message 110b to the back-up point guard node 304h of the zone 306. In one example, the first custom Zigbee unicast message 110a to the primary point guard node 304a and the second custom Zigbee unicast message 110b to the back-up point guard node 304h may be transmitted nearly simultaneously. However, in another example, the first custom Zigbee unicast message 110a and the second custom Zigbee unicast message 110b may be transmitted sequentially with the first custom Zigbee unicast message 110a being transmitted to the primary point guard node 304a prior to transmitting the second custom Zigbee unicast message 110b to the back-up point guard node 304h.

The first custom Zigbee unicast message 110a may include, but is not limited to, a first payload that comprises control instructions that are received by the network controller 302 and identifiers of the one or more nodes 304 of the zone 306 that are to be controlled based on the control instructions. In the first payload of the first custom Zigbee unicast message 110a, the identifiers of the one or more nodes 304 that are to be controlled based on the control instructions may be listed or arranged in a first order.

The second custom Zigbee unicast message 110*b* may include, but is not limited to, a second payload. The second payload may be substantially similar to the first payload except that in the second payload of the second custom Zigbee unicast message 110*b*, the identifiers of the one or more nodes 304 of the zone 306 that are to be controlled based on the control instructions may be listed or arranged in a second order that is different from the first order.

It is noted that the payload of the custom Zigbee unicast messages (110*a*, 110*b*) from the network controller 302 to the point guard nodes (304*a*, 304*h*) may include one or more control instructions as described above in FIGS. 1-2. Further, as described above in association with FIGS. 1-2, the identifiers of the one or more nodes 304 that are to be controlled based on the control instructions may be associated (e.g., linked to, mapped) with the control instructions. For example, if nodes 304 *a-c* are to act upon control instruction_1 and nodes d-g are to act upon control instruction 2, the identifiers of nodes a-c may be associated with control instruction_1 and the identifiers of nodes d-g may be associated with control instruction 2.

In step 405-407, the primary and back-up point guard nodes (304*a*, 304*h*) may receive the first and second custom Zigbee unicast messages (110*a*, 110*b*), respectively, and send an acknowledgement of the receipt of the unicast messages (110*a*, 110*b*) back to the network controller 302. However, if the primary point guard node 304*a* is disabled or not operational, the network controller 302 may stop all communications to the primary point guard node 304*a* and the back-up point guard node 304*b* till the primary point guard node 304*a* becomes operational again or a user manually selects/assigns another node in the zone as a new primary point guard node. In some example embodiments, instead of a manual selection or assignment, if the primary point guard node 304*a* is not operational, the network controller 302 automatically selects or assigns another node in the zone as the new primary point guard node to transmit the custom Zigbee unicast message 110*a*. Till the new primary point guard node of the zone is assigned or till the initial primary point guard node 304*a* becomes operational, the network controller 302 may be configured to transmit unicast messages to each node (e.g., nodes 304*a-p*) in the zone 306 as a fail-safe mechanism and for redundancy.

In some example embodiments, when the primary point guard node 304*a* is not operational, instead of stopping all communications to the primary and the back-up point guard nodes (304*a*, 304*h*), the network controller 302 may be configured to automatically reassign the back-up point guard node 304*h* (provided the back-up point guard node 304*h* is operational) as a temporary primary point guard node. In said example embodiments, the network controller 302 may resume operations through the temporary primary point guard node 304*h* till the initially assigned primary point guard node 304*a* becomes operational or a user assigns a new primary point guard node in the zone. When the initially assigned primary point guard node 304*a* becomes operational again or the user selects a new primary point guard node in the zone 306, the network controller 302 may reassign the temporary primary point guard node 304*h* as the back-up point guard node.

In one example, for redundancy, once the back-up point guard node 304*h* is reassigned as the temporary primary point guard node, the network controller 302 or a user may assign the next most centrally located node (other than non-operational node 304*a* and new primary point guard node 304*h*) in the zone 306 to temporarily operate as the new back-up point guard node till the initially assigned primary point guard node 304*a* becomes operational again or the user selects a new primary point guard node in the zone 306. Alternatively, for redundancy, in addition to reassigning the back-up point guard node 304*h* as the temporary primary point guard node, the network controller 302 may send unicast messages to all the nodes 304*a-p* in the zone 306 as a fail-safe mechanism, i.e., until the initially assigned point guard node 304*a* becomes operational or a user assigns a new primary point guard node in the zone 306 or till a pre-determined length of time has passed.

If a pre-determined length of time has passed and no action has occurred, i.e., the initially assigned primary point guard node 304*a* is still not operational and the user has not selected a new primary point guard node for the zone 306, the network controller 302 may be configured to generate and transmit an alert to a computing device associated with the user. The alert may be configured to inform the user of the status of the point guard nodes in the zone and to request/prompt the user to take appropriate action (e.g., assign the new primary point guard node). In some examples, if the pre-determined length of time has passed, the network controller 302 may automatically fix the back-up point guard node 304*h* as the primary point guard node, provided the back-up point guard node 304*h* is operational.

Responsive to receiving the first custom Zigbee unicast message 110*a*, the primary point guard node 304*a* may be configured to execute operations 410-420 which are substantially similar to operations 208-218 of FIG. 2. Accordingly, only differences between operations 410-420 of FIG. 4 and 208-218 of FIG. 2 will be described below in greater detail for the sake of brevity.

As illustrated in FIG. 4, responsive to receiving the first custom Zigbee unicast message 110*a*, in operation 410, the primary point guard node 304*a* strips the first payload from the first customer Zigbee unicast message 110*a* (hereinafter 'first unicast message 110*a*') and generates a first InterPAN broadcast message 112*a* with the first payload of the first unicast message 110*a*. Then, in operations 411-412, the primary point guard node 304*a* encrypts the first InterPAN broadcast message 112*a* and transmits the encrypted first InterPAN broadcast message 112*a* as a one hop broadcast message to all the nodes in the radio range 314*a* of the primary point guard node 304*a*, e.g., nodes 304*b-g*, 304*h-i*, and 304*k*. In some embodiments, as illustrated in FIG. 3, all the nodes in the radio range 314*a* of the primary point guard node 304*a* may include the back-up point guard node 304*h*. In other example embodiments, the back-up point guard node of a zone may not be in the radio range of the primary point guard node of the zone.

In either case, in operations 413-415, the nodes 304*b-g*, 304*h-i*, and 304*k* in the radio range 314*a* of the primary point guard node 304*a* that receive the first InterPAN broadcast message 112*a* may decrypt the encrypted first InterPAN broadcast message 112*a* and parse the first payload of the first InterPAN broadcast message 112*a* to determine if the identifier of the node is present in the first payload. In operations 416-418, if the identifier of the node is present in the first payload, the respective node may process the first payload to determine the control instruction associated with the identifier of the node and act on the control instruction to change a status of the node as instructed in the control instruction.

Further, in some occasions (e.g. when all the nodes in the zone are not within the radio range of the point guard node), similar to operation 217 of FIG. 2, in operation 419, one or more of the nodes 304*b-g*, 304*h-i*, and 304*k* in the radio range 314*a* of the primary point guard node 304*a* that receive the first InterPAN broadcast message 112a may be configured to re-broadcast the first InterPAN broadcast message 112a one time based on the position of the identifiers associated with the one or more nodes in the first payload of the first InterPAN broadcast message 112a. As described above, the first payload includes a list of identifiers of the nodes that are to be controlled based on the control instructions, where the list is arranged in a first order.

Returning to operations 406 and 408, responsive to receiving the second custom Zigbee unicast message 110b (hereinafter 'second unicast message 110b) and transmitting an acknowledgement to the network controller 302, in operation 421, the back-up point guard node 304h may strip the second payload from the second unicast message 110b and generate a second InterPAN broadcast message 112b with the second payload of the second unicast message 110b. Then, in operations 422-423, the back-up point guard node 304h encrypts the second InterPAN broadcast message 112b and transmits the encrypted second InterPAN broadcast message 112b as a one hop broadcast message to all the nodes in the radio range 314b of the back-up point guard node 304h, e.g., nodes 304a-d and 304i-n.

In some example embodiments, as illustrated in FIG. 3, one or more nodes, e.g., 304b-d, 304 i-k, and 304m-n of the zone 306 may be within the radio ranges (314a, 314b) of both the primary point guard node 304a and the back-up point guard node 304h. In other example embodiments, the primary point guard node 304a and the back-up point guard node 304h may not have any common nodes within the radio ranges (314a, 314b) of the primary point guard node 304a and the back-up point guard node 304h. Further, in some examples, the primary point guard node may or may not be within the radio range of the back-up point guard node.

Upon receiving the encrypted second InterPAN broadcast message 112b, in operations 424-426, the nodes 304a-d and 304i-n in the radio range 314b of the back-up point guard node 304h that receive the second InterPAN broadcast message 112b may decrypt the encrypted second InterPAN broadcast message 112b and parse the second payload of the second InterPAN broadcast message 112b to determine if the identifier of the node is present in the second payload. In operations 427-428, if the identifier of the node is present in the second payload, the respective node may process the second payload to retrieve and determine the control instruction associated with the identifier of the node.

Further, in operation 429, the node whose identifier is present in the second payload may determine whether the control instructions in the second payload are similar to the control instructions that the node received from the first payload of the first InterPAN broadcast message 112a and/or whether the status of the node has already been changed based on the similar command instruction from the first payload of the first InterPAN broadcast message 112a. If the control instructions received from the second payload are the same as the control instructions from the first payload and the status of the node has already been changed as required by the control instructions in the second payload, then, the node may ignore the control instructions and proceed to operation 431. However, if the control instructions received from the second payload are not the same as the control instructions from the first payload and/or the status of the node has already been changed as required by the control instructions in the second payload, then, in operation 430, the node whose identifier is present in the second payload may act on the control instructions to change a status of the node as instructed by the control instructions in the second payload.

Further, in some occasions (e.g. when all the nodes in the zone are not within the radio range of the point guard node), similar to operation 419, in operation 431, one or more of the nodes 304a-d and 304i-n in the radio range 314b of the back-up point guard node 304h that receive the second InterPAN broadcast message 112b may be configured to re-broadcast the second InterPAN broadcast message 112b one time. The one or more of the nodes 304a-d and 304i-n in the radio range 314b of the back-up point guard node 304h may be selected for re-broadcasting based on the position of the identifiers associated with the one or more nodes in the second payload of the second InterPAN broadcast message 112b. As described above, the second payload includes a list of identifiers of the nodes that are to be controlled based on the control instructions, where the list being arranged in a second order.

Since the first order of the identifiers in the first payload of the first InterPAN broadcast message 112a is different from the second order of the identifiers in the second payload of the second InterPAN broadcast message 112, the nodes of the zone that are configured for rebroadcast based on the first InterPAN broadcast message 112a from the primary point guard node 304a may be different from the nodes of the zone that are configured for rebroadcast based on the second InterPAN broadcast message 112b from the back-up point guard node 304h. The different sets of re-broadcast nodes resulting from the first InterPAN broadcast message 112a of the primary point guard node 304a and the second InterPAN broadcast message 112b of the back-up point guard node 304h increases redundancy and reliability.

As described above in association with FIGS. 1-2, the first InterPAN broadcast message 112a and the second InterPAN broadcast message 112b are messages that are devoid of ZigBee networking overhead. That is, the InterPAN broadcast messages (112a, 112b) use only the media access control (MAC) and the physical (PHY) layer headers of the 802.15.4 standard without any of the protocols/specifications of the higher Open System Interconnection (OSI) layers, e.g., network layer, application layer, etc., that are defined specifically by and for the Zigbee standard.

Although the present embodiments have been described with reference to specific example embodiments, it will be evident that various modifications and changes may be made to these embodiments without departing from the broader spirit and scope of the various embodiments. For example, the various devices and modules described herein may be enabled and operated using hardware circuitry (e.g., CMOS based logic circuitry), firmware, software or any combination of hardware, firmware, and software (e.g., embodied in a machine readable medium). For example, the various electrical structures and methods may be embodied using transistors, logic gates, and electrical circuits (e.g., application specific integrated (ASIC) circuitry and/or in Digital Signal Processor (DSP) circuitry).

The terms "invention," "the invention," "this invention," and "the present invention," as used herein, intend to refer broadly to all disclosed subject matter and teaching, and recitations containing these terms should not be misconstrued as limiting the subject matter taught herein or to limit the meaning or scope of the claims. From the description of the exemplary embodiments, equivalents of the elements shown therein will suggest themselves to those skilled in the art, and ways of constructing other embodiments of the present invention will appear to practitioners of the art. Therefore, the scope of the present invention is to be limited only by the claims that follow.

In addition, it will be appreciated that the various operations, processes, and methods disclosed herein may be embodied in a machine-readable medium and/or a machine accessible medium compatible with a data processing system (e.g., a computer system), and may be performed in any order (e.g., including using means for achieving the various operations). Accordingly, the specification and drawings are to be regarded in an illustrative rather than a restrictive sense.

What is claimed is:

1. A system comprising:
a network controller; and
a plurality of nodes that are configured in a wireless mesh network and that are communicatively coupled to the network controller, wherein a node of a subset of nodes of the plurality of nodes is assigned as a point guard node, and wherein the point guard node is configured to:
receive a custom Zigbee unicast message from the network controller, the custom Zigbee unicast message comprising a payload that comprises identifiers of one or more nodes of the subset of nodes and a control command for the one or more nodes,
wherein the network controller is configured to transmit the custom Zigbee unicast message in response to receiving an instruction to control the one or more nodes of the subset of nodes, and wherein the control command is associated with the instruction;
generate an InterPAN broadcast message using the payload of the custom Zigbee unicast message;
encrypt the InterPAN broadcast message to create an encrypted InterPAN broadcast message; and
broadcast the encrypted InterPAN broadcast message to a remainder of the one or more nodes of the subset of nodes that are within a radio range of the point guard node.

2. The system of claim 1, wherein the InterPAN broadcast message is encrypted using a network key that is known to each of the plurality of nodes.

3. The system of claim 1, wherein the network controller randomly assigns the node from the subset of nodes as the point guard node.

4. The system of claim 1, wherein the point guard node is configured to broadcast the encrypted InterPAN broadcast message as a one hop broadcast message.

5. The system of claim 1, wherein the network controller assigns the node that has a highest received signal strength indication (RSSI) value from the subset of nodes as the point guard node.

6. The system of claim 1, wherein the node is manually assigned as the point guard node by an end user.

7. The system of claim 1, wherein the InterPAN broadcast message comprises headers of a media access control layer and a physical layer of an 802.15.4 standard and is devoid of a Zigbee networking overhead.

8. The system of claim 1,
wherein the remainder of the one or more nodes are configured to receive and decrypt the InterPAN broadcast message, and
wherein responsive to decrypting the encrypted InterPAN broadcast message, the remainder of the one or more nodes act on the control command associated with the remainder of the one or more nodes provided an identifier of the one or more nodes is present among the identifiers in the payload of the InterPAN broadcast message.

9. The system of claim 1, wherein at least one of the remainder of the one or more nodes is selected to re-broadcast the InterPAN broadcast message based on a position of an identifier of the at least one of the remainder of the one or more nodes in the payload of the InterPAN broadcast message.

10. The system of claim 1, wherein the plurality of nodes comprises lighting devices, the lighting devices comprising wireless communication modules.

11. A non-transitory computer readable medium stored in a network controller that is communicatively coupled to a plurality of nodes that form a wireless mesh network, the computer readable medium comprising instructions which when executed by a processor of the network controller system causes the network controller to perform a method comprising:
receiving an instruction to control one or more nodes of a subset of nodes of the plurality of nodes; and
responsive to receiving the instruction, transmitting a custom Zigbee unicast message to a node of the subset of nodes, the custom Zigbee unicast message comprising a payload that comprises the instruction and identifiers associated with the one or more nodes of the subset of nodes that are to be controlled based on the instruction,
wherein the node of the subset of nodes is assigned as a point guard node that is configured to generate an InterPAN broadcast message using the payload of the custom Zigbee unicast message and broadcast the InterPAN broadcast message as a one hop broadcast message to a remainder of the one or more nodes of the subset of nodes that are within a radio range of the point guard node.

12. The non-transitory computer readable medium of claim 11, wherein the network controller is communicatively coupled to a node control device, and wherein the network controller is configured to receive the instruction from the node control device.

13. The non-transitory computer readable medium of claim 12, wherein the node control device comprises at least one of a control switch and a sensor, and wherein the sensor comprises an occupancy sensor.

14. The non-transitory computer readable medium of claim 11, wherein the plurality of nodes comprises lighting devices.

15. The non-transitory computer readable medium of claim 11, wherein the network controller is configured to assign the point guard node, and wherein the node that is assigned as the point guard node is a centrally located node in the subset of nodes.

16. The non-transitory computer readable medium of claim 11, wherein the point guard node is manually assigned by a user.

17. A system comprising:
a plurality of lighting devices that form a wireless network and that are communicatively coupled to a network controller, wherein a lighting device of a subset of lighting devices of the plurality of lighting devices is assigned as a primary point guard node, and wherein the primary point guard node is configured to:
receive a first custom Zigbee unicast message from the network controller, the first custom Zigbee unicast message comprising a first payload that comprises identifiers of one or more lighting devices of the subset of lighting devices and an instruction to control the one or more lighting devices, wherein the identifiers of the one or more lighting devices in the first payload are arranged in a first order, and wherein the network controller is configured to transmit the first custom Zigbee unicast message in response to receiving the instruction to control the one or more lighting devices of the subset of lighting devices;

generate a first InterPAN broadcast message using the first payload of the first custom Zigbee unicast message; and broadcast the first InterPAN broadcast message to a remainder of the one or more lighting devices of the subset of lighting devices that are within a radio range of the primary point guard node, wherein at least one of the remainder of the one or more lighting devices is selected to re-broadcast the first InterPAN broadcast message based on a position of an identifier of the at least one of the remainder of the one or more lighting devices in the first payload of the first InterPAN broadcast message.

18. The system of claim 17, wherein another lighting device of the subset of lighting devices of the plurality of lighting devices is assigned as a back-up point guard node, and wherein the back-up point guard node is configured to:

receive a second custom Zigbee unicast message from the network controller, the second custom Zigbee unicast message comprising a second payload that comprises the identifiers of the one or more lighting devices of the subset of lighting devices and the instruction to control the one or more lighting devices, wherein the identifiers of the one or more lighting devices in the second payload are arranged in a second order that is different from the first order, and wherein the network controller is configured to transmit the second custom Zigbee unicast message in response to receiving the instruction to control the one or more lighting devices of the subset of lighting devices;

generate a second InterPAN broadcast message using the second payload of the second custom Zigbee unicast message;

broadcast the second InterPAN broadcast message to a remainder of the one or more lighting devices of the subset of lighting devices that are within a radio range of the back-up point guard node, wherein at least one of the remainder of the one or more lighting devices is selected to re-broadcast the second InterPAN broadcast message based on a position of an identifier of the at least one of the remainder of the one or more lighting devices in the second payload of the second InterPAN broadcast message.

19. The system of claim 18, wherein the at least one of the remainder of the one or more lighting devices that is selected to re-broadcast the second InterPAN broadcast message is different from the at least one of the remainder of the one or more lighting devices that is selected to re-broadcast the first InterPAN broadcast message.

20. The system of claim 18, wherein the primary point guard node and the back-up point guard node are manually assigned, and wherein the wireless network is a wireless mesh network.

* * * * *